Aug. 12, 1930.  Z. AUERBACH  1,772,926
FILING OR INDEX SYSTEM
Original Filed Aug. 17, 1925  5 Sheets-Sheet 1
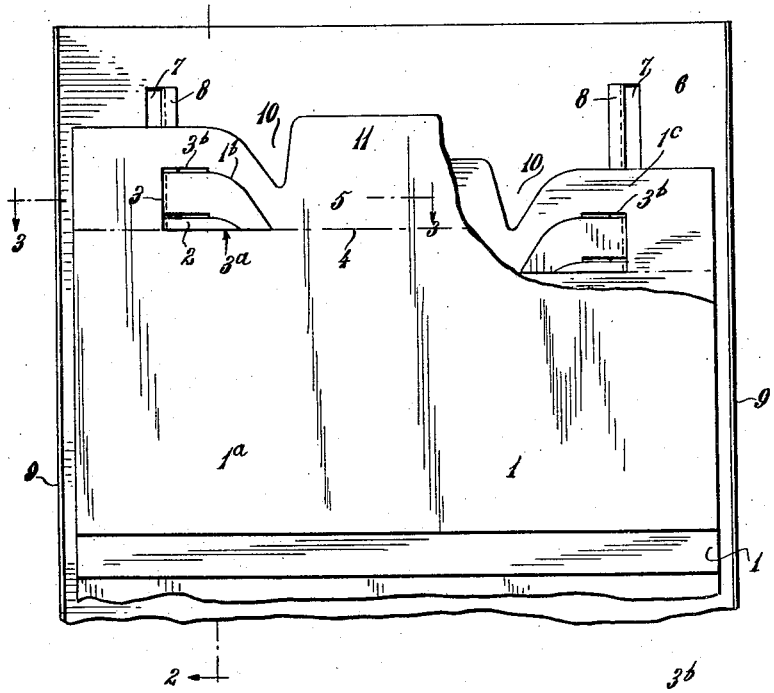
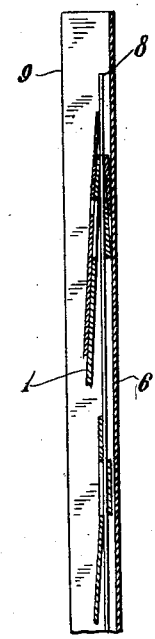
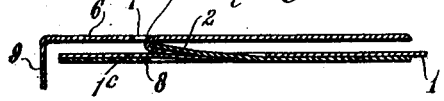
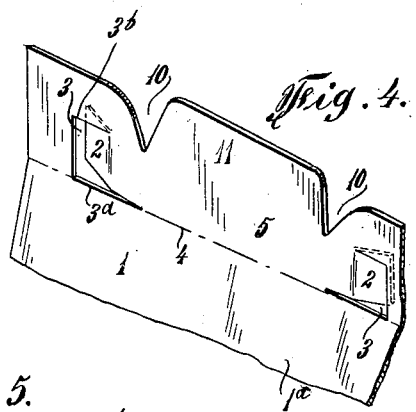
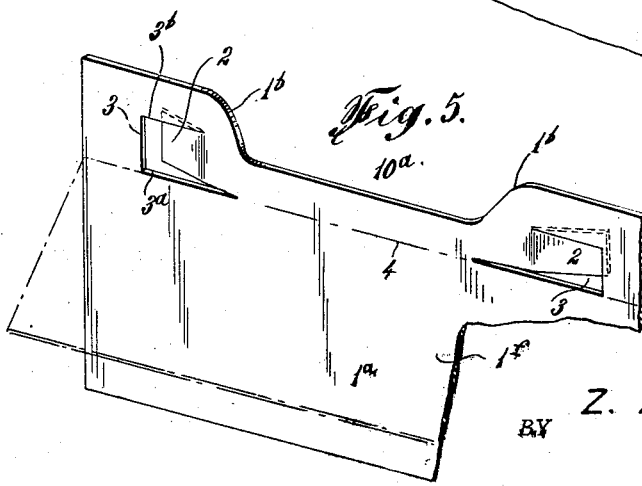
INVENTOR
Z. Auerbach
BY
ATTORNEY

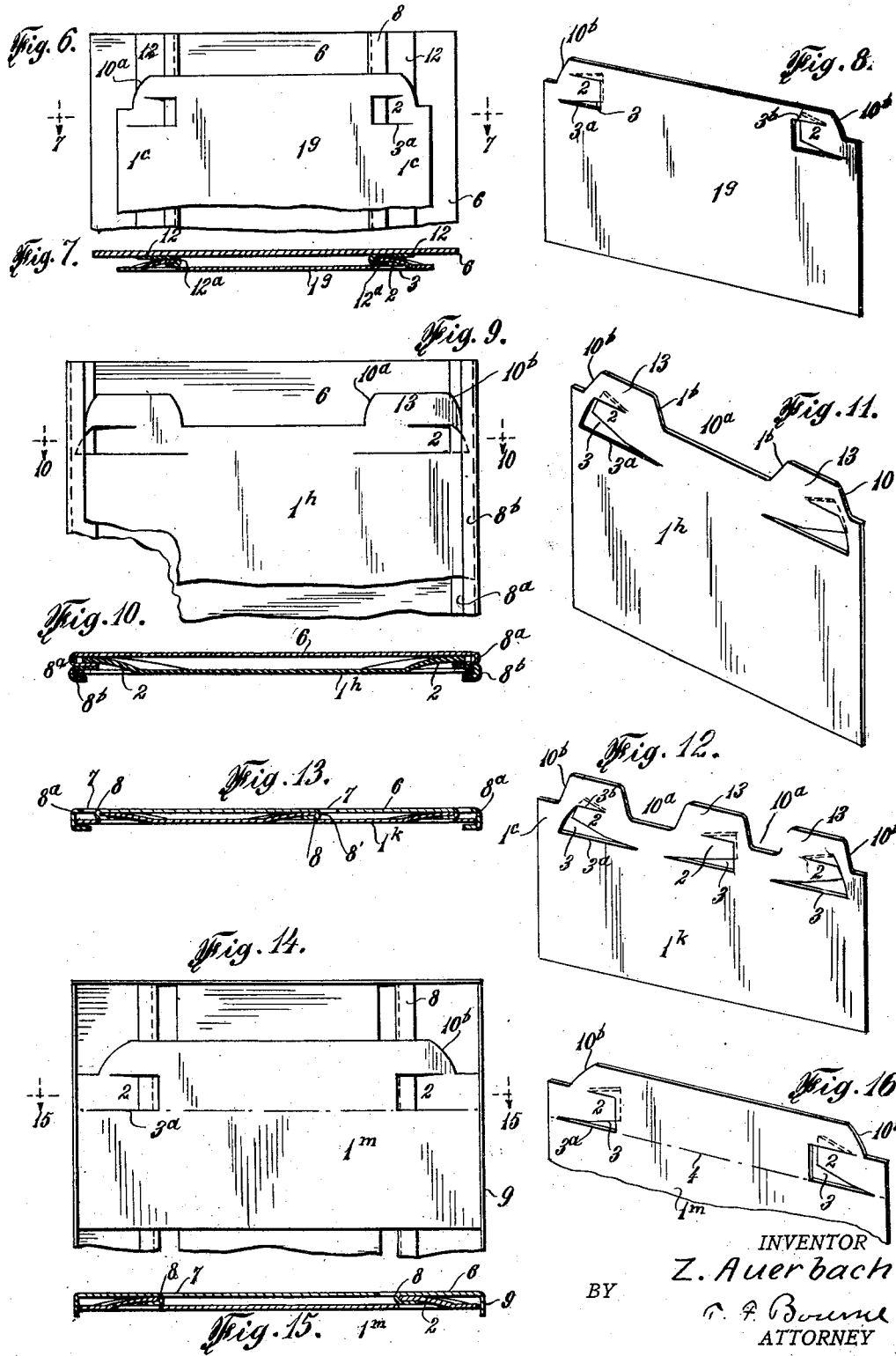

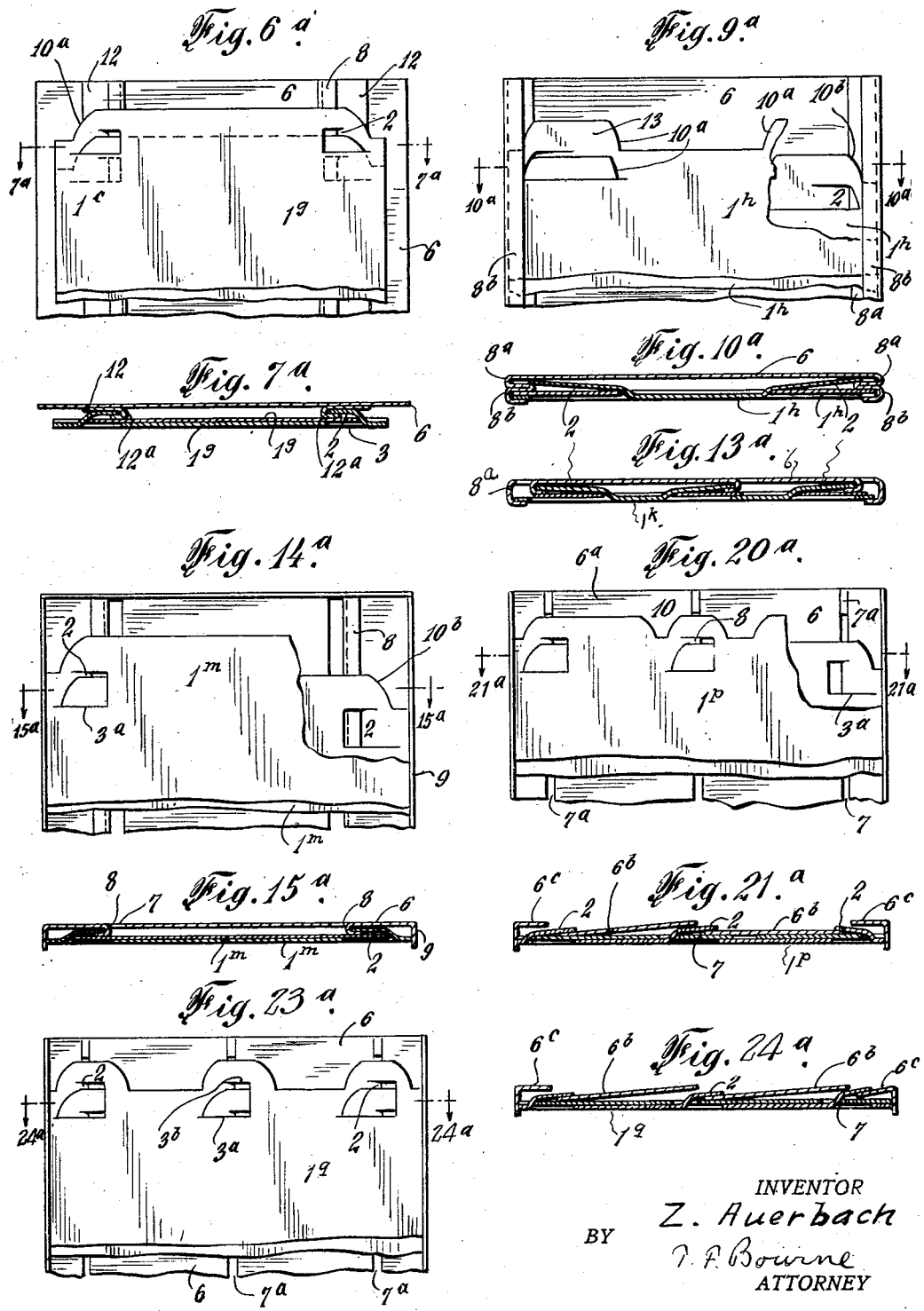

Aug. 12, 1930.   Z. AUERBACH   1,772,926
FILING OR INDEX SYSTEM
Original Filed Aug. 17, 1925   5 Sheets-Sheet 4

Inventor:
Z. Auerbach
by T. F. Bourne
Atty

Aug. 12, 1930.   Z. AUERBACH   1,772,926
FILING OR INDEX SYSTEM
Original Filed Aug. 17, 1925   5 Sheets-Sheet 5
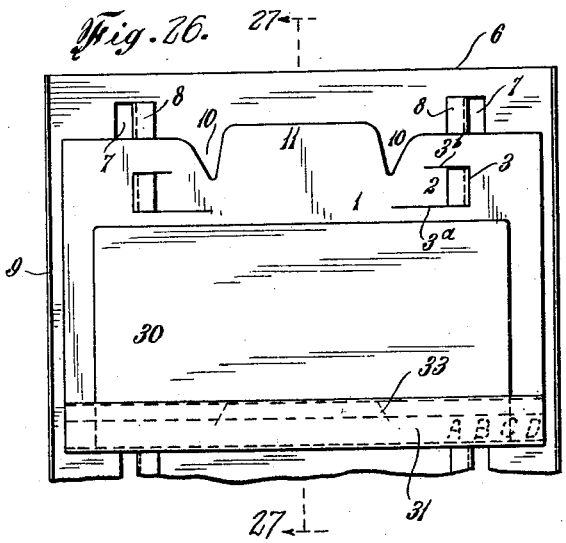
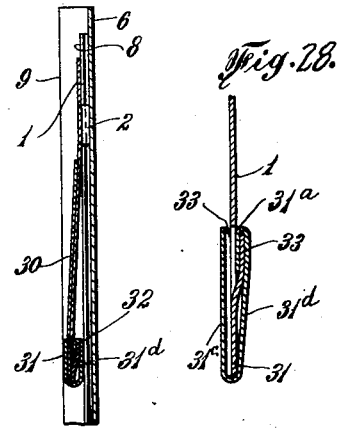
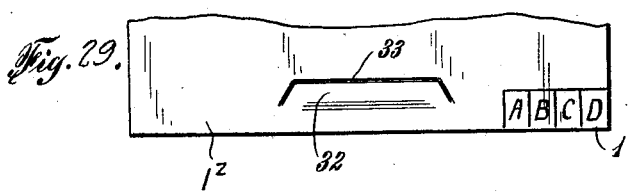
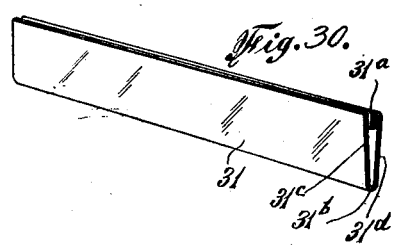
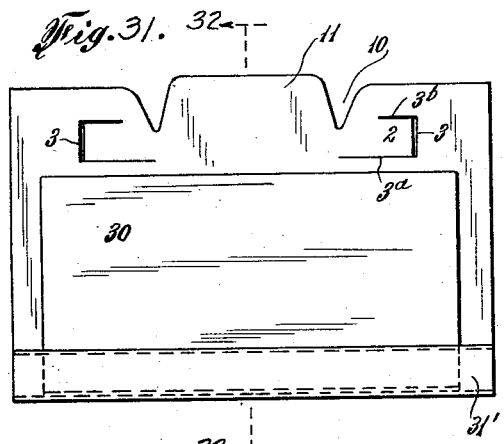
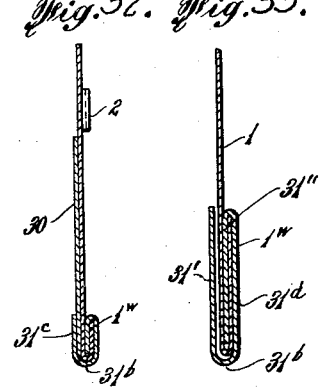
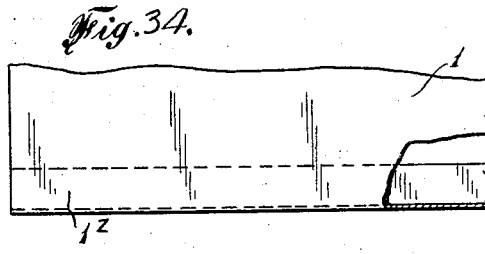
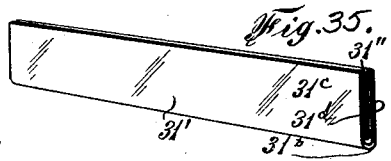
INVENTOR
Z. Auerbach
BY A. F. Bourne
ATTORNEY Patented Aug. 12, 1930

1,772,926

UNITED STATES PATENT OFFICE

ZEMACH AUERBACH, OF NEW YORK, N. Y.

FILING OR INDEX SYSTEM

Application filed August 17, 1925, Serial No. 50,676. Renewed January 4, 1930.

My invention has reference to improvements in filing systems, also sometimes called card indexes, of the class in which separate cards are assembled upon one another in a suitable rack or holder to permit ready access to the several cards, and to enable removal and replacement of the cards.

The principal object of my invention is to provide improved cards which may be readily inserted and slidably retained in a rack and will interengage with one another to keep them in a closely related endwise condition permitting ready access to any of the cards as well as convenient removal and replacement thereof with respect to the rack.

My invention comprises a card of the class specified provided with means located within the margins thereof, in the nature of one or more projections or tongues, adapted to cooperate with guiding means upon a rack for detachably retaining the cards therein and permitting the cards to be slid lengthwise along the rack, as well as to be folded or swung back and forth for access to any of the cards for writing thereon or reading therefrom.

My invention also comprises novel details of improvement that will be more fully hereinafter set forth and then pointed out in the claims.

Reference is to be had to the accompanying drawings forming a part hereof, wherein—

Fig. 1 is a partly broken face view illustrating a portion of a rack and cards embodying my invention;

Fig. 2 is a section on line 2, 2, in Fig. 1;

Fig. 3 is a section on line 3, 3 in Fig. 1;

Fig. 4 is a perspective of one of the cards;

Fig. 5 is a perspective of a modification;

Fig. 6 is a face view illustrating a modification;

Figure 17:
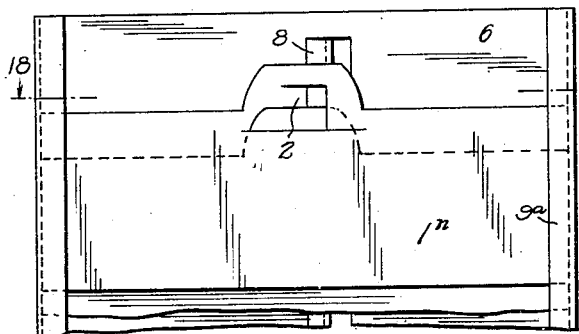
Figure 19:
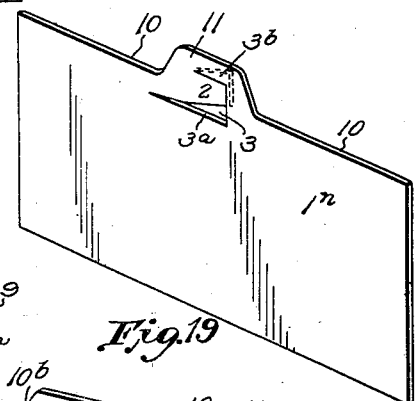
Figure 18:
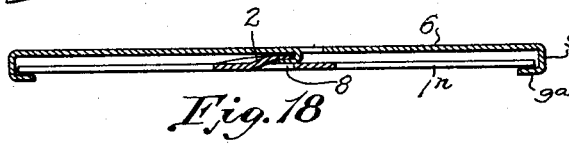
Figure 20:
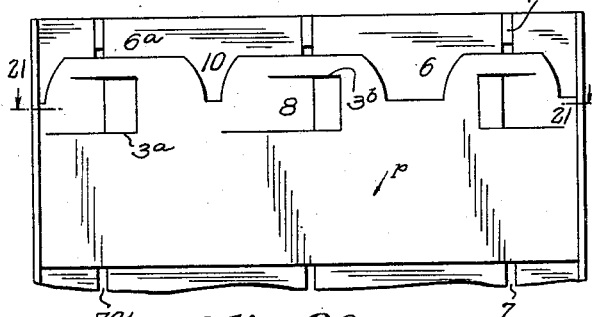
Figure 22:
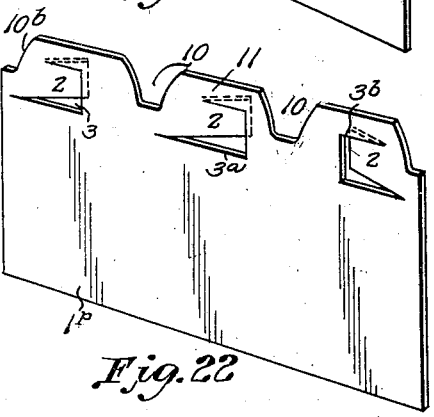
Figure 21:
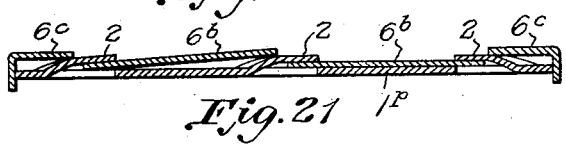
Figure 25:
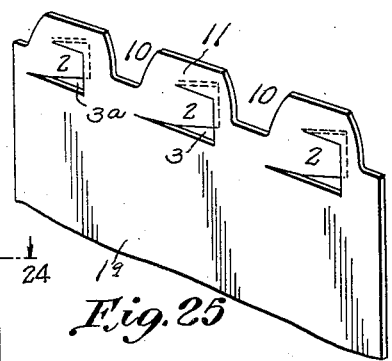
Figure 23:
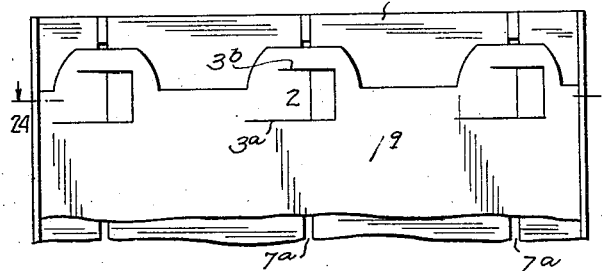
Figure 24:
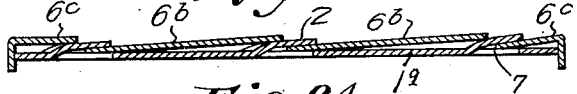

Fig. 6$^a$ is a face view corresponding to Fig. 6, showing superposed cards;

Fig. 7 is a section on line 7, 7, in Fig. 6;

Fig. 7$^a$ is a section on line 7$^a$, 7$^a$, in Fig. 6$^a$;

Fig. 8 is a perspective of the card of Fig. 6;

Fig. 9 is a face view illustrating a modified form of rack and card;

Fig. 9$^a$ is a partly broken face view similar to Fig. 9, illustrating superposed cards;

Fig. 10 is a section on line 10, 10, in Fig. 9;

Fig. 10$^a$ is a section on line 10$^a$, 10$^a$, in Fig. 9$^a$;

Fig. 11 is a perspective of the card of Fig. 9;

Fig. 12 is a perspective of a modified form of the card shown in Fig. 11;

Fig. 13 is a sectional view of a rack with a card like Fig. 12;

Fig. 13$^a$ is a view similar to Fig. 13, illustrating superposed cards;

Fig. 14 is a face view illustrating a modified form of rack and card;

Fig. 14$^a$ is a partly broken face view similar to Fig. 14, illustrating superposed cards;

Fig. 15 is a section on line 15, 15, in Fig. 14;

Fig. 15$^a$ is a section on line 15$^a$, 15$^a$, of Fig. 14$^a$;

Fig. 16 is a detail of the card of Fig. 14;

Fig. 17 is a face view illustrating a modification;

Fig. 18 is a section on line 18, 18, in Fig. 17;

Fig. 19 is a perspective of a card of Fig. 17;

Fig. 20 illustrates a modified form of rack;

Fig. 20$^a$ is a partly broken face view similar to Fig. 20, showing superposed cards;

Fig. 21 is a section on line 21, 21, in Fig. 20;

Fig. 21$^a$ is a section on line 21$^a$, 21$^a$, in Fig. 20$^a$;

Fig. 22 is a perspective of the card of Fig. 21;

Fig. 23 is a perspective of another form of rack and card;

Fig. 23ª is a face view corresponding to Fig. 23, showing superposed cards;

Fig. 24 is a section on line 24, 24, in Fig. 23;

Fig. 24ª is a section on line 24ª, 24ª, of Fig. 23ª;

Fig. 25 is a detail of the card of Fig. 23;

Fig. 26 is a face view illustrating means upon a card to detachably retain a temporary card;

Fig. 27 is a section on line 27, 27, in Fig. 26;

Fig. 28 is an exaggerated detail of Fig. 27;

Fig. 29 is a detail of part of the card;

Fig. 30 is a perspective detail of the card retainer;

Fig. 31 is a face view of a modified form of Fig. 26;

Fig. 32 is a section on line 32, 32, in Fig. 31;

Fig. 33 is an exaggerated detail of Fig. 32;

Fig. 34 is a detail of part of the card of Fig. 31. and

Fig. 35 is a perspective of the card retainer of Fig. 31.

Similar numerals of reference indicate corresponding parts in the several views.

The cards 1 may be of any suitable material, such as paper or cardboard, of a suitable shape, preferably rectangular. The cards are provided with one or more projections or tongues 2 which are located within the margins of the cards adapted to engage the guides of racks or holders for detachably retaining the cards therein. In the forms shown in Figs. 1 to 8 the projections 2 are formed by producing angularly disposed slits at 3 in the card, leaving the inner portions of the projections integrally attached to the cards, in the nature of a hinge, so that the projections may be pushed sideways or laterally from the plane of the card to engage guides of the rack. Said projections extend toward the side margins or edges of the card. Some cards are provided with transverse score lines forming hinging means, indicated at 4, so that the upper portion 5 of the cards that has the projections 2 forms supporting means for the lower free portion 1ª of the card, whereby the latter may be swung along the score line for access to opposite sides of the card and for access to the cards beneath a given card. At 6 is indicated a rack which may be made of suitable material. In the form shown in Figs. 1 to 7 the rack may be made of metal having one or more longitudinal slots 7 and the material adjacent to one side of the slot is bent reversely over the body of the rack at 8 and spaced from the rack to form a guide or guides. At the margins the rack is preferably provided with outwardly turned edges at 9 between which the cards lie and whereby the edges of the cards are protected. When the cards are to be applied to the rack the cards may be suitably bent to enable the projections 2 to be tucked into engagement with the guides 8 so that the cards are retained by the projections superposed upon one another and may slide along the rack. As shown in Figs. 1 to 8, including Figs. 6ª and 7ª, the lower edge 3ª of the slit part 3 of the card is longer than the upper edge 3ᵇ thereof so that when the cards are assembled projecting corner portion of one card at the rounded or curved upper edge 1ᵇ may slide into the opening of an adjacent card, as shown in Fig. 6ª, and such projection will engage the upper edge 3ᵇ of the corresponding opening and determine the overlap of the cards upon one another. In Figs. 1 to 4 the card is provided with recesses at 10 providing the intermediate projecting portion 11, whereby the upper edge of a projection 2 of one card will enter the recess 10 of a card therebehind to enable the cards to tuck together or interengage. When the cards are in the rack the projection 2 of a card will lie behind the guide 8 and the marginal portion 1ᶜ of the card will lie over the rack, (Fig. 3), whereby the card is retained from displacement. The projections 2 engage inner bent portions or folds 8' of guides 8 and thereby limit edgewise movement of the card in the rack, (Fig. 3). In the form shown in Fig. 5 the projecting portion 11 of Figs. 1 to 4 of the card 1ᶠ is omitted, providing recess 10ª, so that the portions 1ᵇ of one card may pass through the openings 3 of the next card for assembling the cards in superposed close relationship.

In Figs. 1, 2 and 3 the rack is shown provided with two spaced guides 8 to cooperate with the two corresponding spaced projections 2 of the cards, which projections at their free ends extend outwardly toward the side margins of the card.

In Figs. 6, 7, 8, 6ª and 7ª the card 1ᵉ is provided with two spaced projections 2 which, at the free ends, extend inwardly toward each other away from the side margins or edges of the card. In this instance the guides 8 of the rack are formed by means of separate strips 12 extending along the rack and having their appropriate marginal edges bent reversely at 12ª to receive the projections 2 of the guide, the guides being so positioned that the projections will engage the cards to limit lateral movement of the cards on the rack. The corners of the card are reduced at 10ᵇ adjacent to the projections 2 to enter the openings 3 of a superposed card so the top edge of one card will engage the top edges 3ᵇ of openings 3 to cause snugging or interengaging of the cards together in overlapping relation.

In Figs. 9, 10, 11, 9ª and 10ª the cards 1ʰ are arranged substantially as in Figs. 6 and 8, except that they also have the central recesses 10ª and the reduced portions 1ᵇ and 10ᵇ providing spaced projections 13 that are adapted to pass through the openings 3 of one or more superposed cards for the purpose aforesaid. In the form shown in Figs. 9 and 10 the rack 6 is provided with guides $8^a$ under which the projections 2 pass and upon the guides $8^a$ are channel pieces $8^b$, which may be secured to the inwardly extending flanges of the guides $8^a$ by soldering the parts together. The pieces $8^b$ are adapted to receive the adjacent edges of the cards for retaining them in the rack.

In Figs. 12, 13 and $13^a$ the card $1^k$ has three openings 3 and three corresponding projections 2 with the corresponding edges of the openings $3^a$ and $3^b$, two of which projections extend toward one side margin of the card and the other projection extends toward the other side margin of the card, adapted to engage the marginal guides $8^a$ of rack 6 and an intermediate guide 8, formed in the manner shown in Fig. 3. The guides $8^a$ receive the side edges of the card and keep the latter in position.

In the form shown in Figs. 6 to 12 the cards are not provided with the score line or hinge 4.

In Figs. 14, 15, $14^a$, $15^a$ and 16 the projections 2 of the cards $1^m$ extend inwardly toward each other and the cards are provided with the reduced corners $10^b$ to enter openings 3, the rack 6 being provided with the inwardly bent guides 8 that face toward the sides of the rack to receive the projections 2, the marginal edges of the rack being bent outwardly at 9 to oppose the side edges of the cards.

In Figs. 17, 18 and 19 the card $1^n$ is provided with a single projection 2, shown centrally disposed, and the rack is provided with a single guide 8 to cooperate with the projection 2 of said card. In Fig. 17 the rearward card is not shown in the position of minimum spacing. The marginal portions 9 of the rack are turned inwardly at $9^a$ to overlie the marginal edges of the cards and retain the latter from lateral displacement since there is but a single projection on a card and a single guide 8 on the rack.

Instead of forming the guides 8 by means of the slots 7 and the edges along the slots bent reversely in hook-like form, the base of the rack may be provided with longitudinal slots $7^a$ terminating near the ends of the rack and the end portions $6^a$ of the rack at the terminations of the slots at $7^a$ may be bent laterally so as to offset the intermediate portions $6^b$ of the rack at the slots with respect to the portions $6^c$, (Figs. 20 and 21), to permit the projections 2 of the cards $1^p$ to pass through the slots and enter behind the adjacent material of the rack. In the form shown in Figs. 20, 21 and 22 the cards $1^p$ have two projections 2 extending in one direction and another projection 2 extending reversely, the base of the rack being correspondingly offset to receive such projections, whereas in Figs. 23, 24 and 25 the projections 2 of the card $1^q$ all extend in one direction and the portions $6^b$ of the rack are correspondingly offset from the side portions $6^c$ to receive the projections 2. The same arrangement of rack may be provided for any number of projections on the cards.

I also provide cards with retaining means at their free edges for temporary cards 30, arranged as illustrated in Figs. 26 to 35. As shown in Figs. 26 to 30 I provide a detachable retainer 31 adapted to be slid endwise along the free or lower edge $1^z$ of card 1, the card otherwise being shown similar to the card of Figs. 1 to 4. The card is shown provided with a tongue 32 produced by cutting an angularly disposed slit 33 in the card, whereby the tongue may be bent to one side of the plane of the card to receive the inwardly folded edge portion or web $31^a$ of retainer 31. The retainer comprises a piece of suitable material, preferably translucid, such as transparent or translucent, folded along its portion $31^b$ to produce the substantially parallel webs $31^c$ and $31^d$, with the web $31^a$ therebetween. When the retainer is to be applied to the card one end of the retainer is adjusted at one end of the free edge $1^z$ of the card and the retainer is slid along the card to engage its folded web $31^a$ with the tongue 32, the lower folded portion $31^b$ of the retainer receiving the extreme edge of the card, whereby the retainer is locked to the card detachably. The web $31^c$ of the retainer is free from card 1 so that a temporary or loose card or cards 30 may be inserted in the pocket formed between the web $31^c$ and the retainer. The lower edge of card 1 may be provided with indicators, commonly called signals, indicated at A, B, C, D, in position to be observed through the translucid retainer 31. When it is desired to check off or replace the signals the retainer may be slid along the edge of the card for access to the signals. The retainer serves as a protector for the edge $1^z$ of the card.

In the form shown in Figs. 31 to 35 instead of providing tongue 32 cut from the material of the card the free edge of the card may be bent reversely, as indicated at $1^w$, extending upwardly along a face of the card and the retainer $31'$ has the inwardly bent portion or web $31''$, preferably nearly as deep as the reverse portion $1^w$ of the card 1, to interengage between the former and the card with the part $1^w$ between the parts $31''$ and $31^d$ and has a front web $31^c$ along one face of the card forming a pocket to receive a temporary card 30. The retainer may be slid lengthwise along the edge of card 1 to apply and remove the same, and the signals A, B, C, D may be upon the card 1, as before described. The card of Figs. 31 to 35 is of the variety shown in Figs. 1 to 4.

Having now described my invention what I claim is:—

1. A filing card provided with a projection located within the margins of the card said card having an opening from which the projection extends, the lower edge of the opening being longer than its upper edge, whereby the opening is in position to receive an edge portion of an adjoining card to engage the shorter edge along the opening for spacing superposed cards.

2. A filing card provided with a projection located within the margins of the card, the card being provided with an opening from which the projection extends, the card being provided with a recess adjacent to the projection to permit an associate portion of the card to interengage with a similar opening of a superposed card.

3. A filing card provided with an opening within the margin of the card, and a projection located at said opening and integral with the card, the lower edge of the opening being longer than its upper edge, said card having a marginal portion along an adjacent edge to enter a similar opening of superposed card to engage the shorter edge along said opening to space superimposed cards.

4. A filing card provided with an angular slit within its margin, and an integral projection formed by said slit, said slit, having two substantially parallel spaced portions, one being located farther from an adjacent edge of the card than the other and of greater length than the latter to admit an edge portion of an adjacent similar card into the opening corresponding to said projection.

5. In a filing system, a rack having a longitudinal slot and a portion of the material of the rack adjacent to the slot folded over the body of the rack providing a guide, marginal portions of the rack being extended outwardly in position to engage cards, and a card having an opening and a projection at the opening within the margin of the card to engage said guide, the adjacent edge of the card being adapted to pass through the corresponding opening in a similar card for interengaging the cards.

6. In a filing system a rack provided with a longitudinal slot and having a portion of the material of the rack adjacent to the slot bent laterally over the rack and spaced therefrom forming a guide, and a card having a projection within the margin of the card to cooperate with said guide, said card being provided with an opening located at the projection, the adjacent edge of the card being adapted to pass through the corresponding opening in a similar card for interengaging the cards.

7. In a filing system, a rack having a longitudinal slot, the material of the rack adjacent to the slot being offset laterally from the plane of the rack providing a guide, and a card having a projection within the margin thereof adapted to engage said guide.

8. A filing card having a projecting portion adjacent to one end, and a retainer folded to form three webs, two of the webs being adapted to interengage with the projecting portion of the card to connect the retainer therewith, the other web of the retainer being free from the card providing a pocket for a temporary card.

ZEMACH AUERBACH.